March 10, 1959     K. JANISZEWSKI     2,877,063

LUBRICANT RETAINER FOR LEADER PIN BUSHINGS AND THE LIKE

Filed Nov. 15, 1956

INVENTOR.
KASIMIR JANISZEWSKI
BY
Wheeler, Wheeler + Wheeler
ATTORNEYS

United States Patent Office 2,877,063
Patented Mar. 10, 1959

2,877,063

LUBRICANT RETAINER FOR LEADER PIN BUSHINGS AND THE LIKE

Kasimir Janiszewski, Hales Corners, Wis.

Application November 15, 1956, Serial No. 622,438

12 Claims. (Cl. 308—5)

This invention relates to a lubricant retainer for leader pin bushings and the like.

The invention has particular reference to the lubrication of the leader pin and bushing of a die set. The invention contemplates that the bushing will be provided with a floating piston or disk guided for reciprocation within the bushing for the retention of oil therein, the reciprocation being effected in one direction by the entry of the leader pin and being effected in the opposite direction by atmospheric pressure consequent upon the withdrawal of the leader pin. Stop means of some sort is provided to limit the outward reciprocation of the lubricant supporting plunger, two different expedients being disclosed for this purpose, one of which is an undercut groove into which the skirt of the piston expands and the other of which is a spring ring which expands into a groove of the bushing to permit the passage of the leader pin and re-enters the path of the floating piston as the leader pin is withdrawn.

In one embodiment of the invention, the floating plunger is dual, the lubricant being confined in the space between two interconnected plungers and exposed to the wall of the bushing between such plungers so that the oil is retained in all positions of the bushing, even though the latter may be inverted during handling.

Figure 4:
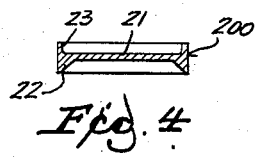
Figure 5:
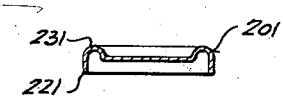
Figure 6:
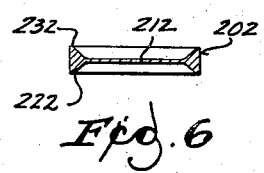

Figs. 4, 5, and 6 are detail views in transverse section through slightly modified forms of plungers.

Figures 7, 8:
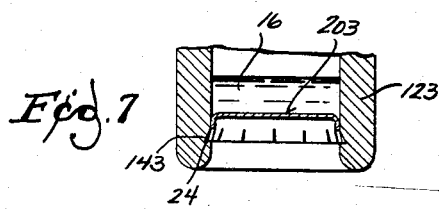

Fig. 7 is a fragmentary view of a modified bushing and floating plunger in axial section.

Fig. 8 is a detail view partially in side elevation and partially in axial section through the plunger of Fig. 7.

Figure 9:
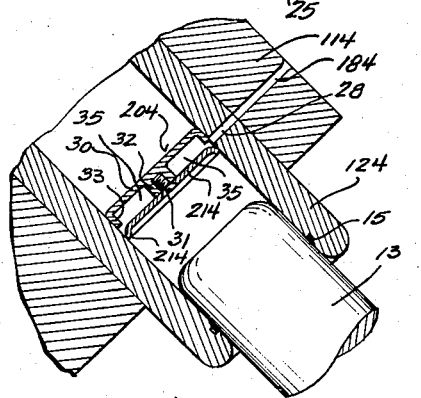

Fig. 9 is a view showing a dual floating plunger arrangement in axial section, portions of the bushing and die carrying plate being fragmentarily illustrated in section.

It will be understood that the disclosure of the invention as applied to a die set is illustrative, since the lubricating principle involved is useful in other devices presenting the problem of lubricating a normally open cylindrical bearing surface upon the withdrawal of a part telescopically receivable therein.

The part indicated by reference character 10 represents the conventional platen of a punch press upon which the die carrier 11 is mounted in any appropriate manner. Fixed in the plate 11 is a bushing 12 opening downwardly to receive the leader pin 13.

Figure 2:
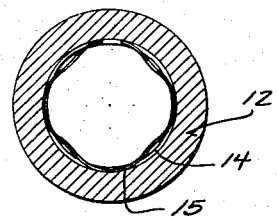
Fig. 2 is a view taken in section on line 2—2 of Fig. 1.

In the undercut groove 14 within the otherwise cylindrical bearing surface of bushing 12 is a resilient retaining ring 15 which desirably has a convoluted form best shown in Fig. 2 so that in the normal position of such ring, its convolutions project from the groove 14 into the path of a floating piston 20, the ring serving to retain the piston within the bushing. Upon entry of the leader pin 13 into the bearing surface of bushing 12, the convolutions 15 of ring 14 are pushed aside by the leader pin. However, as the leader pin is withdrawn, the convolutions spring back to the position of Fig. 2 where they intercept floating piston 20 and bring it to rest within the bushing.

A quantity of oil shown at 16 is supported on the floating piston 20 in contact with the bearing surface of the bushing for the lubrication thereof. Replacement oil may be introduced into the bushing through a duct 18 which also serves as a vent to maintain atmospheric pressure on the surface of the oil.

As the leader pin 13 enters the bushing, either by reason of its upward movement or by reason of the downward movement of the bushing, it actuates the floating plunger 20 either by direct contact therewith or by trapping air between the leader pin and the floating piston to push it in a direction which is upward respecting the bushing, the body of oil 16 being lifted with the plunger in the bushing to lubricate the bearing surface of the bushing in advance of the engagement of the leader pin therewith. As the floating plunger 20 and the body of oil 16 rise respecting the bushing, no air is trapped above the oil, since the air can readily escape through the vent 18.

In the opposite direction of relative movement between the leader pin and bushing, the film of oil on the interior bearing surface of the bushing assures a hermetically tight fit between the bushing and the floating plunger 20 and also between the bushing and the leader pin 13. In consequence, the outward movement of the leader pin respecting the bushing would create a vacuum between the leader pin and the floating plunger 20, but for the fact that the atmospheric pressure to which the surface of the oil is constantly subject through vent 18 causes the floating piston 20 and the oil carried thereon to descend with the leader pin consequent upon the withdrawal of the latter, which descending movement being arrested only by the stop spring 14, the convolutions of which expand into the bearing space as the leader pin is withdrawn to intercept the floating plunger 20 in the position shown in Fig. 1.

Figure 1:
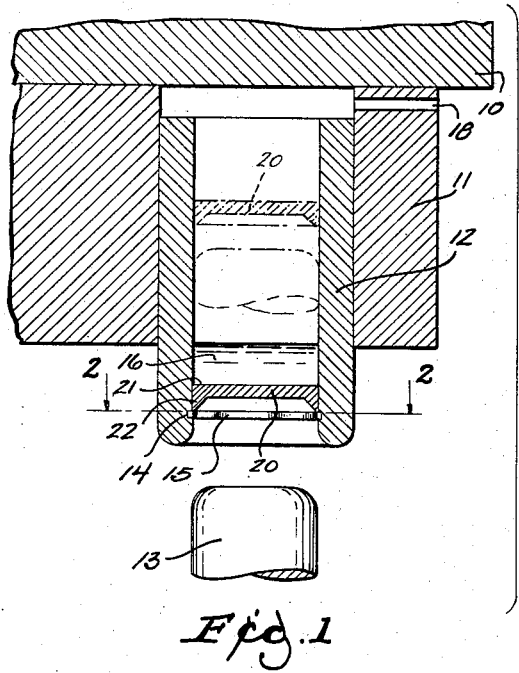
Fig. 1 is a view in axial section through a bushing and floating plunger embodying the invention, portions of a platen and die carrier and leader pin being fragmentarily illustrated.
Figure 3:
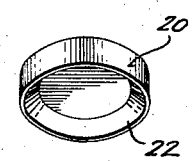
Fig. 3 is a detail view in bottom perspective of the floating plunger shown in Fig. 1.

The floating plunger 20 may have a flat upper surface at 21 and a depending skirt 22 as shown in Fig. 1 and Fig. 3. Alternatively it may be turned to the form of the plunger 200 shown in Fig. 4 in which a flange at 23 extends upwardly from the surface 21, the skirt 22 remaining unchanged. Another embodiment made by stamping is shown at 201 in Fig. 5. The skirt 221 is a downward extension from a bead 231 connected with the web portion 211.

The swaged device 202 of Fig. 6 has its web portion 212 symmetrically disposed within a rim which is of triangular shape to provide both the upwardly extending flange portion 232 and the downwardly extending skirt portion 222.

In the device shown in Figs. 7 and 8, the undercut groove 143 of the bushing 123 expands downwardly to an abrupt shoulder at 24. The floating plunger 203 has a skirt portion 223 which flares outwardly but is divided by slits 25 into resiliently yieldable segments 26 which expand into the groove 143 to arrest the movement of the plunger when the segments 26 encounter the shoulder 24. While the device shown in Figs. 7 and 8 operates much like that shown in Fig. 1, the Fig. 1 construction has been found more satisfactory, it being preferred to use a resilient stop which comprises the split ring 15 in preference to the resilient segments of the slit skirt portion of the floating plunger. This is, however, a matter which depends, in part, upon the extent of bearing surface provided between the floating plunger and the interior of the bushing, to keep the plunger from tilting respecting the bushing axis. In Fig. 9 I have disclosed a further modified embodiment in which, in addition to advantages in the way of oil retention, there is an extended bearing surface which makes it very practicable to use either form of stop.

In the Fig. 9 embodiment, the bushing 124 has a lateral duct 28 communicating with the duct 184 in the plate 114. The floating plunger 204 comprises a pair of flanged disks 214 and 30 connected together in any desired manner, such as a screw 31 which is seated in the disk 214 and threaded into a boss 32 with which the disk 30 is provided. The disk 30 has a skirt flange 33 while the disk 214 has a short skirt 224. The two annular skirts are in axial alignment, thus giving the effect of an elongated bearing surface.

Between the two disks of the plunger 204 is an oil reservoir at 35 which, in the extreme uppermost position of the plunger respecting the bushing, may register with the ducts 28—184 so that oil can be inserted from the exterior to replenish oil used up in the course of lubricating the surfaces of the bushing.

This device operates exactly like the device first described in that the dual plunger is pushed in one direction by engagement with the end of the leader pin 13 and is actuated in the opposite direction by atmospheric pressure as the leader pin and bushing separate. However, this device has the advantage of retaining the oil against loss even if the entire die set is inverted, the oil being confined by the upper disk 30 under such circumstances. Fig. 9 shows the parts in a position in which the axis of relative movement between the leader pin and bushing is inclined. This may be a position of actual operation in use or it may be regarded as an intermediate position in the inversion of the parts.

As already noted, the means for arresting relative outward movement of the dual piston respecting the bushing may involve any desired form of stop which will intercept the floating plunger without intercepting the leader pin. By way of example, it will be evident that either of the arrangements shown in Figs. 1 and 7 may be used.

I claim:

1. In a device of the character described, the combination with relatively movable members having complementary bearing surfaces, one of which surfaces is tubular, of a floating piston reciprocable along the tubular bearing surface and disposed in the path of relative movement of the other member to be actuated by differential pressures established in the movement of said other member, the said floating piston comprising a support upon which a body of lubricant is mounted for the lubrication of the tubular bearing surface in the course of piston movement, said surface being open to the atmosphere at the side of the piston opposite said other member.

2. The combination set forth in claim 1 in which the floating piston has axially extended surfaces whereby the floating piston is maintained substantially normal to its axis of reciprocation.

3. The device of claim 1 in which the floating piston comprises a pair of mutually connected and axially spaced confining elements between which there is provided a chamber in which said lubricant is confined against loss in either direction of axial movement of the piston, the said chamber opening peripherally to the said cylindrical bearing surface, whereby said surface is exposed to the lubricant.

4. The combination set forth in claim 1 in further combination with means for limiting the movement of the floating piston in one direction respecting said bearing surface.

5. In a device of the character described, the combination with relatively movable members having complementary bearing surfaces, one of which surfaces is tubular, of a floating piston reciprocable along the tubular bearing surface and disposed in the path of relative movement of the other member to be actuated by differential pressures established in the movement of said other member, the said floating piston comprising a support upon which a body of lubricant is mounted for the lubrication of the tubular bearing surface in the course of piston movement, in further combination with means for limiting the movement of the floating piston in one direction respecting said bearing surface, said means comprising an undercut groove in the member providing the cylindrical bearing surface, said groove providing a shoulder and said limiting means further comprising stop means engaging said shoulder.

6. The device of claim 5 in which the stop means comprises a ring seated on the shoulder within the groove and having yieldable convolutions normally projecting into the path of the floating piston and the path of the other member, the other member having a cam surface at its end for forcing said convolutions into the groove out of the path of the other member.

7. The device of claim 5 in which said stop means comprises a skirt connected with the floating piston and having expandable portions normally confined within the cylindrical bearing surface and adapted to expand into said groove for engagement with said shoulder.

8. In a device of the character described, the combination with a bushing and leader pin, of a floating piston in the bushing and means for limiting the outward movement of the piston with respect to the bushing, the end of the bushing remote from the leader pin being vented, and the floating piston comprising a support for a body of lubricant, said floating piston being reciprocated in the bushing by differential pressures created in the course of relative movement between the bushing and leader pin.

9. The device of claim 8 in which the means for limiting outward movement of the floating piston comprises a convoluted stop ring having portions seated in a groove with which the bushing is internally provided and having other portions projecting inwardly from said groove into the path of piston movement, the leader pin having cam surfaces for forcing said last mentioned portions aside, the ring being resiliently flexible.

10. The device of claim 9 in which the means for limiting outward movement of the piston comprises a resilient piston skirt having radially expansible portions, the bushing being internally shouldered to receive contact with said portions upon registry of the piston skirt with said shoulder.

11. The device of claim 10 in which the piston comprises axially spaced portions providing a radially opening chamber for said lubricant.

12. The device of claim 11 in which both of said portions are skirted to provide axially elongated bearing surfaces for the floating piston, the said portions having means connecting them interiorly of their respective skirts.

References Cited in the file of this patent
UNITED STATES PATENTS

| | | |
|---|---|---|
| 1,574,355 | Baumbach | Feb. 23, 1926 |
| 1,832,493 | Marsilius | Nov. 17, 1931 |
| 2,101,757 | Schumacher | Dec. 7, 1937 |
| 2,523,358 | Conner | Sept. 26, 1950 |
| 2,749,987 | Janiszewski | June 12, 1956 |